United States Patent Office 2,891,101
Patented June 16, 1959

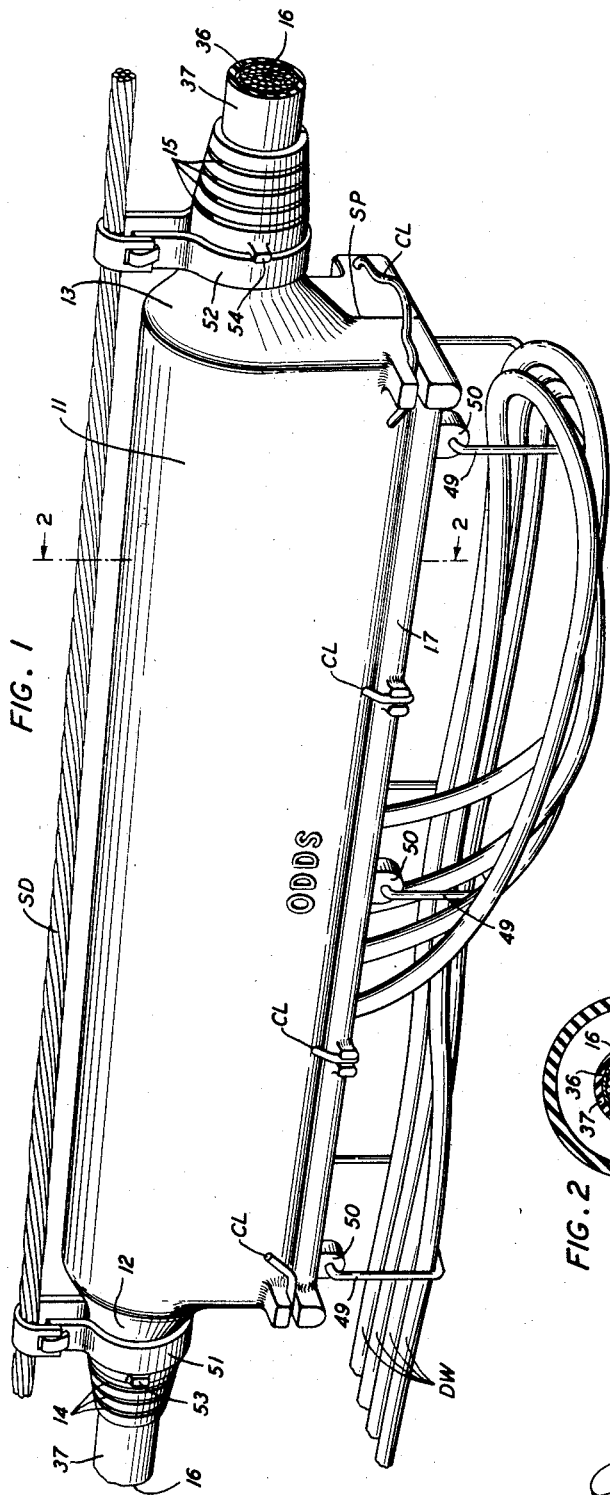

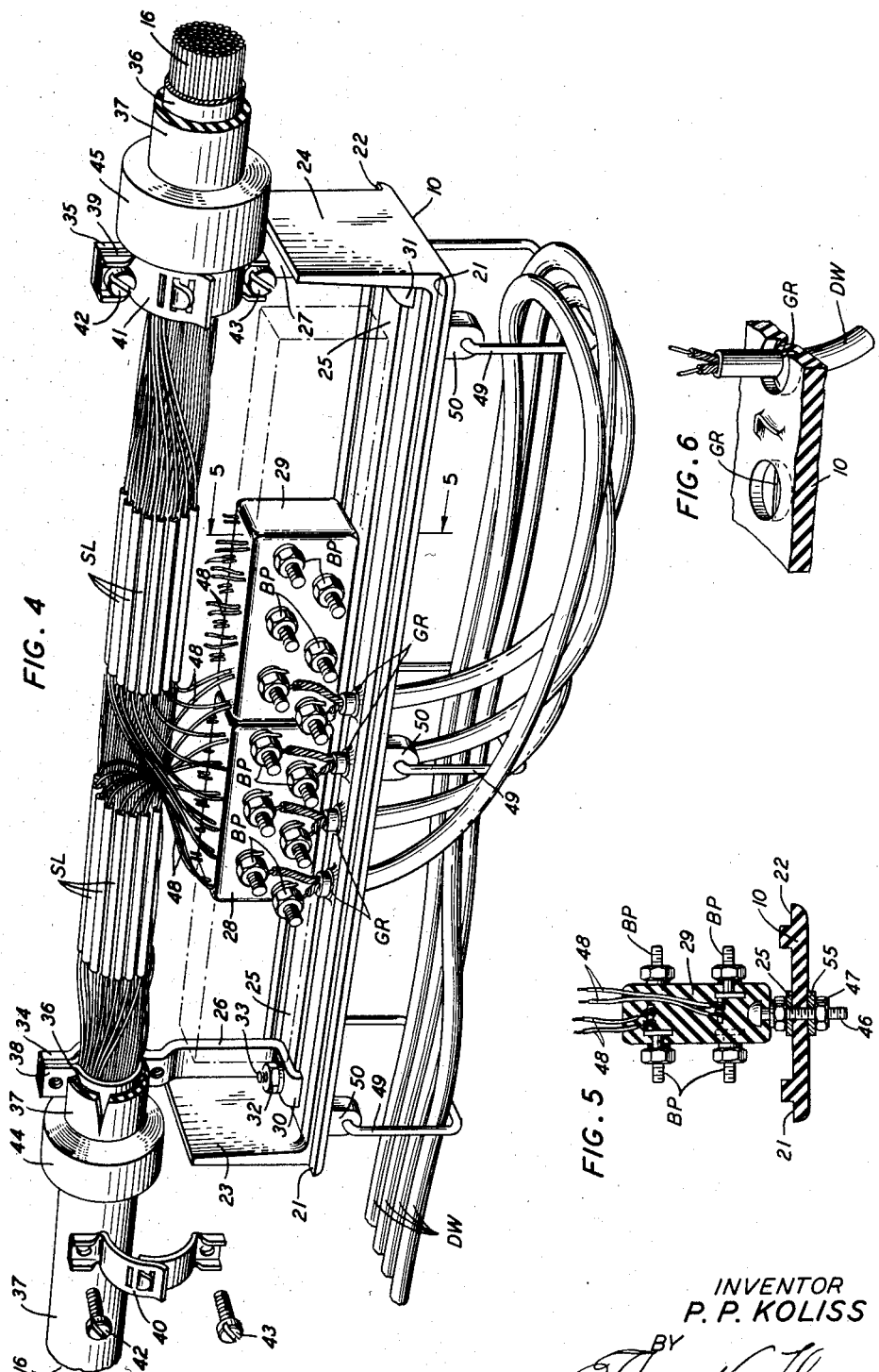

2,891,101

COMBINED SPLICE CLOSURE AND CABLE TERMINAL FOR PLASTIC SHEATHED CABLE

Peter P. Koliss, Madison, N.J., assignor to Bell Telephone Laboratories, Incorporated, New York, N.Y., a corporation of New York Application August 2, 1955, Serial No. 526,022

7 Claims. (Cl. 174—59)

This invention relates to splice closures for plastic sheathed multiconductor cables and, more particularly to a combined splice closure and terminal.

An object of this invention is the provision of a mechanical closure and terminal for enclosing joints in multiconductor cable and the making of connections readily to the conductors in the cable wherein the joint is adequately protected from the elements.

Another object of the invention is the provision of a combined splice closure and terminal for multiconductor cable wherein access to the conductors in the cable is facilitated for circuit rearrangements.

A further object of the invention is the provision of a combined splice closure and terminal wherein the number of pairs terminated for connection to the conductors in the cable are considerably reduced.

A still further object of the invention is the provision of a combined splice closure and terminal wherein cables having different outside diameters may be readily accommodated.

A still further object of the invention is the provision of a combined splice closure and terminal wherein the enclosing envelope or cover is constructed from a single preformed piece of a strong resilient tough material, such as neoprene, which, due to its novel construction, provides a cover which may be readily removed to expose all the interior elements of the terminal structure thereby providing ready access to all parts thereof.

A still further object of the invention is the provision of a combined splice closure and terminal wherein a plurality of individually molded terminal blocks, each having a plurality of bonding posts and extending pigtail connections, molded therein, may be readily accommodated in any desired number.

A still further object of the invention is the provision of a combined splice closure and terminal which, due to its novel construction, may be used interchangeably on metallic or plastic sheathed cable.

The combined splice closure and terminal of this invention is of the mechanical type as differentiated from the well known lead sleeve wiped joint type and is adapted to, but not restricted to, multiconductor cables wherein the protecting sheath comprises an outer jacket of insulating material, such as thermoplastic, overlying a thin metallic sheath which surrounds and encloses the conductors.

With the introduction of plastic insulated conductors enclosed in a plastic sheath cable, it has been found unnecessary to provide, in the telephone plants, splice closures and terminals having gas and moisture sealing features; hence, with this requirement eliminated, simpler and more efficient methods of making connections to the pairs in the cable may be utilized.

The combined splice closure and terminal of this invention sets forth a new concept in exchange plant flexibility by providing ready access to all circuit pairs of a cable serving a given subscriber area and permitting inexpensive connections to these pairs on a "as required basis" instead of the present preconnected terminal multipling system.

The combined splice closure and terminal in one specific embodiment of this invention comprises a one-piece envelope or cover, a base assembly and a terminal block assembly. The cover or envelope is molded from a suitable tough resilient material, such as neoprene, and is adapted to snap on and be clamped to the base assembly which is also constructed of neoprene and which has mounted thereon the terminal block assembly. The ends of the cover are tapered and may be cut at preformed grooves to fit various sizes of cable. The cover may be readily removed by hand after the locking clamps are loosened.

The terminal block assembly, which is secured to the base member, comprises six pair terminals constructed from a suitable cast resin and provided with binding posts on each face for connection to the subscriber's drop wires.

The terminal blocks are also equipped with embedded plastic color coded insulated wires or pigtails which are factory connected to each binding post and which are arranged to be connected directly to the proper conductor pairs in the cable at the time that the service drop is attached to the terminal block binding posts, thereby permitting the connection of the terminal to the cable by means of a two conductor splice instead of the present three.

The one-piece neoprene cover or envelope which protects the assembly, as above described, is split longitudinally at its end portions, fits snugly over the sheath of the cable, embraces the marginal edges of the base member to provide a weather resistant joint, and is held in place by suitable clamps.

Suitable sheath embracing clamps, which extend upwardly from the base member and underlying the cover or envelope, are provided for supporting the assembly from the cable, and sealing compound is interposed around the cable sheath between the clamps and the inner ends of the cover to prevent the entrance of moisture.

The invention will be more clearly understood from the following detailed description when read in connection with the accompanying drawing, of which:

Fig. 1 is a view in perspective of the combined splice closure and terminal of this invention suspended from a suitable supporting strand, embracing the ends of the cable and having a plurality of drop wires emerging from the base of the assembly;

Fig. 2 is a cross-sectional view taken on line 2—2 of Fig. 1;

Fig. 3 is a fragmentary view, partly in section, of the end detail of the combined closure and terminal with the sealing compound positioned up against the reduced end of the cover;

Fig. 4 is a view similar to Fig. 1 except that the cover has been removed to expose the internal structure;

Fig. 5 is a cross-sectional view taken on line 5—5 of Fig. 4; and

Fig. 6 is a fragmentary view, partly in section, illustrating the manner in which the drop wires pass through the base plate.

In one specific embodiment of my invention, as shown in the various figures, I have provided an elongated housing having a cross section of inverted U-shaped configuration which is intended to enclose the cable splice, house the terminal blocks, provide weather resisting characteristics, and at the same time provide adequate mechanical strength to prevent rupture of the joint.

The specific structure of this embodiment of my invention comprises, as shown in Figs. 1, 2 and 4, a base member 10 constructed of a tough resilient insulating material such as neoprene, and a molded envelope or cover 11, also composed of a material similar to the base, but which may be of any suitable material having the weather resisting properties to enable it to retain its shape and provide protection for the enclosed assembly over a long period of time, as long, for example, as the cable itself. The cover 11, which is substantially U-shaped in cross section, is molded from a single piece of material and is provided at its ends with reduced or necked-down portions 12 and 13, which are split longitudinally on the under side, as at SP and are provided with circumferential grooves 14 and 15. The grooves 14 and 15 provide means for adapting the ends of the cover 11 to fit various diameters of cables 16 by cutting through the desired groove.

As shown in Fig. 1 and, in more detail, in Fig. 2, the marginal edges of the cover 11 are provided with inturned flanges 17 and 18 to provide the grooved portions 19 and 20 which firmly enclose and embrace the rabbeted edges 21 and 22 of the base member 10. The rabbeted edges are shown in detail in Fig. 5 and provide a moisture resistant joint at this location due to the clamping action of the clamps CL which bridge the bottom of the base 10 on the under side thereof, engaging the flanges 17 and 18, and which also clamp the base 10 at its ends, as shown in Figs. 1 and 2.

As shown in Figs. 2, 4 and 5, the base member 10 comprises an elongated member of suitable insulating material having rabbeted edges 21 and 22 and upstanding end portions 23 and 24. Extending the full length of the base member 10 and secured to the inner bottom surface thereof is a metal reenforcing strap 25 which serves not only to reenforce the assembly but provides mounting means for brackets 26 and 27 and terminal blocks 28 and 29. A second reenforcing strip 55 is located on the bottom of the base member, extends the full length thereof, and is secured to the reenforcing strip 25 by means of the clamp-securing nut and bolts 32 and 33 and the stud members 46 and nuts 47.

As heretofore referred to and as shown in detail in Fig. 4, the combined closure and terminal of this invention is supported from the cable 16 by means of suitable brackets 26 and 27. These brackets are provided at their lower ends with right-angle portions 30 and 31 which engage the upper surface of the strap 25 and are secured thereto by means of the nuts and bolts 32 and 33 which pass through strap 25 and also through strap 55. The upper portions of the clamps 26 and 27 are provided, adjacent their ends, with arcuate portions 34 and 35 which conform to the contour of the sheath of the cable 16 and firmly embrace it.

As shown in detail in Fig. 4, at the point where the arcuate portions 34 and 35 of the brackets 26 and 27 embrace the sheath 37 of the cable 16, which has been slit longitudinally, there is interposed between the conductors, which form the core of the cable 16, and the thin metal inner sheath 36, metal encircling clamps 38 and 39; the left-hand clamp and bracket assembly is shown exploded in Fig. 4 to depict the assembly more clearly. These clamps serve to protect the conductors in the cable and provide a reenforcing means when the assembly, which comprises the two-piece clamps 40 and 41, and the brackets 26 and 27 are secured in position by means of the bolts 42 and 43 which pass through apertures in the clamps 40 and 41 and engage the threaded apertures in the brackets 26 and 27, as shown at the right-hand end of Fig. 4.

In order to prevent the entrance of moisture around the cable 16 extending from the cover 11, bushings 44 and 45 composed of a suitable sealing compound are positioned around the cable sheath 37 adjacent the brackets 26 and 27.

As shown in Figs. 4 and 5, terminal blocks 28 and 29 are secured in position on the strap 25 end-to-end and are held in position by means of molded in studs 46 which extend through the strap 25, the base member 10, and the strap 55, as shown in detail in Figs. 2 and 5, and have nuts 47 positioned thereon. For the purpose of illustration I have shown only two terminal blocks, i.e., 28 and 29. However, as indicated by the dot and dash lines, additional blocks may be mounted on the strap 25.

In the illustrated embodiment of my invention, I have shown six pairs of binding posts BP, molded in each terminal block, three pairs extending from each face of the block. However, it is to be understood that any number and any arrangement of binding posts may be provided and any shape or size of terminal block may be utilized. Each binding post BP has on its embedded end a pair of color coded wires 48 which have been connected thereto prior to the molding of the terminal blocks. These wire pairs 48 extend in pigtails from the terminal blocks 28 and 29 and are arranged to be connected to the proper conductor pairs in the cable in the usual well known manner and insulated by means of the sleeves SL. With the structure as above described, we have each pair of a cable conductor pair looped, connected to suitable binding posts BP in the terminal block and emerging from the terminal block to be connected to the respective conductor pair in the cable. Thus we have, as shown, connected to each binding post BP, looped color coded wires which are arranged to be connected to one conductor of the conductor pair in the cable and which provide a through circuit which is tapped by a binding post BP.

Subscriber's drop wires DW may be connected to their respective binding posts BP on the terminals 28 and 29 and, as shown, pass through integral grommets GR formed in the base 10, as seen best in Fig. 6, and are supported by means of the hangers 49 which downwardly depend from lugs 50 on the bottom surface of the base 10 as shown in Figs. 1 and 4.

As shown in Fig. 1, the combined splice closure and terminal of this invention is supported from the suspension strand SD, by means of hangers 51 and 52, which encircle the split ends of the cover 10 adjacent the necked-down portions 12 and 13 and which are maintained in position by means of the lugs 53 and 54.

While I have described and illustrated one preferred embodiment of my invention, it is to be understood that I do not limit myself to any specific material or to any particular shape of cover and that various changes and modifications may be made therein without departing from the spirit of the invention.

What is claimed is:

1. A combined splice closure and terminal for multiconductor cables comprising in combination a sheathed multiconductor cable, a base member, a reinforcing member positioned thereon and extending longitudinally with respect thereto, means comprising split bracket members mounted on said base member and embracing said reinforcing member for securing it to an unbroken length of said cable, a terminal block mounted on said base member and having binding posts thereon for making electrical connections thereto, said terminal block having additional electrical terminals thereon for making connections to the conductors in said cable, a resilient nonmetallic one-piece cover having split ends and lower marginal edges overlying the ends of the cable and secured thereto, bushings surrounding said cable ends, on the interior of said cover and in engagement therewith for preventing the entrance of moisture, the marginal edges of said cover overlapping and tightly embracing said base member along its sides for defining a weatherproof chamber for said terminal block, and clamping means on said marginal edges for holding said edges into intimate engagement with said base member and for maintaining closed the split ends of said closure.

2. A combined splice closure and terminal for multiconductor cables comprising in combination a sheathed multiconductor cable, a base member, a reinforcing member positioned thereon and extending longitudinally with respect thereto, means comprising upwardly extending split bracket members mounted on said base member and embracing said reinforcing member for securing it to an unbroken length of said cable, a terminal block mounted on said base member and having binding posts thereon for making electrical connections thereto, said terminal block having additional electrical terminals thereon for making connections to the conductors in said cable, a resilient nonmetallic one-piece cover having split ends and lower marginal edges overlying the ends of the cable and secured thereto, bushings surrounding said cable ends on the interior of said cover and in engagement therewith, for preventing the entrance of moisture, the marginal edges of said cover overlapping and tightly embracing said base member along its sides for defining a weatherproof chamber for said terminal block, and clamping means on said marginal edges for holding said edges into intimate engagement with said base member and for maintaining closed the split ends of said closure.

3. A combined splice closure and terminal for multiconductor cables comprising in combination a sheathed multiconductor cable, a base member, a reinforcing member positioned thereon and extending longitudinally with respect thereto, means comprising split bracket members mounted on said base member and embracing said reinforcing member for securing it to an unbroken length of said cable, a terminal block mounted on said base member and having binding posts thereon for making electrical connections thereto, said terminal block having pigtail electrical terminations thereon for making connections to the conductors in said cable, and a resilient nonmetallic one-piece cover having split ends and lower marginal edges overlying the ends of the cable and secured thereto, bushings surrounding said cable ends, on the interior of said cover and in engagement therewith, for preventing the entrance of moisture, the marginal edges of said cover overlapping and tightly embracing said base member along its sides for defining a weatherproof chamber for said terminal block, and clamping means on said marginal edges for holding said edges into intimate engagement with said base member and for maintaining closed the split ends of said closure.

4. A combined splice closure and terminal for multiconductor cables comprising in combination a sheathed multiconductor cable, a base member, a reinforcing member positioned thereon and extending longitudinally with respect thereto, means comprising split bracket members mounted on said base member and embracing said reinforcing member for securing it to an unbroken length of said cable, a terminal block mounted on said base member and having binding posts thereon for making electrical connections thereto, said terminal block having additional electrical terminations thereon for making connections to the conductors in said cable, a resilient non-metallic one-piece inverted U-shaped cover having split ends and lower marginal edges overlying the ends of the cable and secured thereto, bushings surrounding said cable ends, on the interior of said cover and in engagement therewith, for preventing the entrance of moisture, the marginal edges of said cover embracing said base member along its sides for defining a weatherproof chamber for said terminal block, and clamping means on said marginal edges for holding said edges into intimate engagement with said base member and for maintaining closed the split ends of said closure.

5. A combined closure and terminal for multiconductor cables comprising in combination a sheathed multiconductor cable, a base member, means comprising split bracket members mounted on said base member for securing it to an unbroken length of said cable, a longitudinally extending reinforcing member on said base member, a terminal block mounted on said reinforcing member and having binding posts thereon for making electrical connections thereto, said terminal block having additional electrical terminations thereon for making connections to the conductors in said cable, a resilient one-piece inverted U-shaped cover having split ends and lower marginal edges overlying the ends of the cable and secured thereto, bushings surrounding said cable ends, on the interior of said cover and in engagement therewith, for preventing the entrance of moisture, the marginal edges of said cover overlapping and tightly embracing said base member along its sides for defining a weatherproof chamber for said terminal block, and clamping means on said marginal edges for holding said edges into intimate engagement with said base member and for maintaining closed the split ends of said closure.

6. A combined splice closure and terminal for multiconductor cables comprising in combination a sheathed multiconductor cable, a base member, a reinforcing member positioned thereon and extending longitudinally with respect thereto, means comprising upwardly extending split brackets mounted on said base member and embracing said reinforcing member for securing it to an unbroken length of said cable, a terminal block mounted on said base member and having binding posts thereon for making electrical connections thereto, said terminal block having additional electrical terminations thereof for making connections to the conductors in said cable, a resilient non-metallic one-piece cover having split ends and lower marginal edges overlying the ends of the cable and secured thereto, bushings surrounding said cable ends, on the interior of said cover and in engagement therewith, for preventing the entrance of moisture, the marginal edges of said cover being inwardly flanged to provide grooves which overlap and embrace said base member along its sides for defining a weatherproof chamber for said terminal block, and clamping means on said marginal edges for holding said edges into intimate engagement with said base member and for maintaining closed the split ends of said closure.

7. A combined splice closure and terminal for multiconductor cables comprising in combination a sheathed multiconductor cable, a base member having rabbeted sides, a reinforcing member positioned thereon and extending longitudinally with respect thereto, means comprising split bracket members mounted on said base member and embracing said reinforcing member for securing it to an unbroken length of cable, a terminal block mounted on said base member and having binding posts thereon for making electrical connections thereto, said terminal block having additional electrical terminations thereon for making connections to the conductors in said cable, a resilient non-metallic one-piece inverted U-shaped cover having split ends and lower marginal edges overlying the ends of the cable and secured thereto, bushings surrounding said cable ends, on the interior of said cover and in engagement therewith, for preventing the entrance of moisture, the marginal edges of said cover overlapping and tightly embracing said base member along its rabbeted sides for defining a weatherproof chamber for said terminal block, and clamping means on said marginal edges for holding said edges into intimate engagement with said member and for maintaining closed the split ends of said closure.

References Cited in the file of this patent

UNITED STATES PATENTS

| Number | Name | Date |
|---|---|---|
| 905,347 | McMeen | Dec. 1, 1908 |
| 1,680,940 | Emmons | Aug. 14, 1928 |
| 1,999,796 | Zinser | Apr. 30, 1935 |
| 2,126,891 | Kelsay | Aug. 16, 1938 |
| 2,533,137 | Neale | Dec. 5, 1950 |
| 2,740,001 | Vergilio | Mar. 27, 1956 |